May 1, 1923.
A. H. VAN DE POL
FURNACE CONSTRUCTION
Filed Feb. 12, 1921
1,453,960
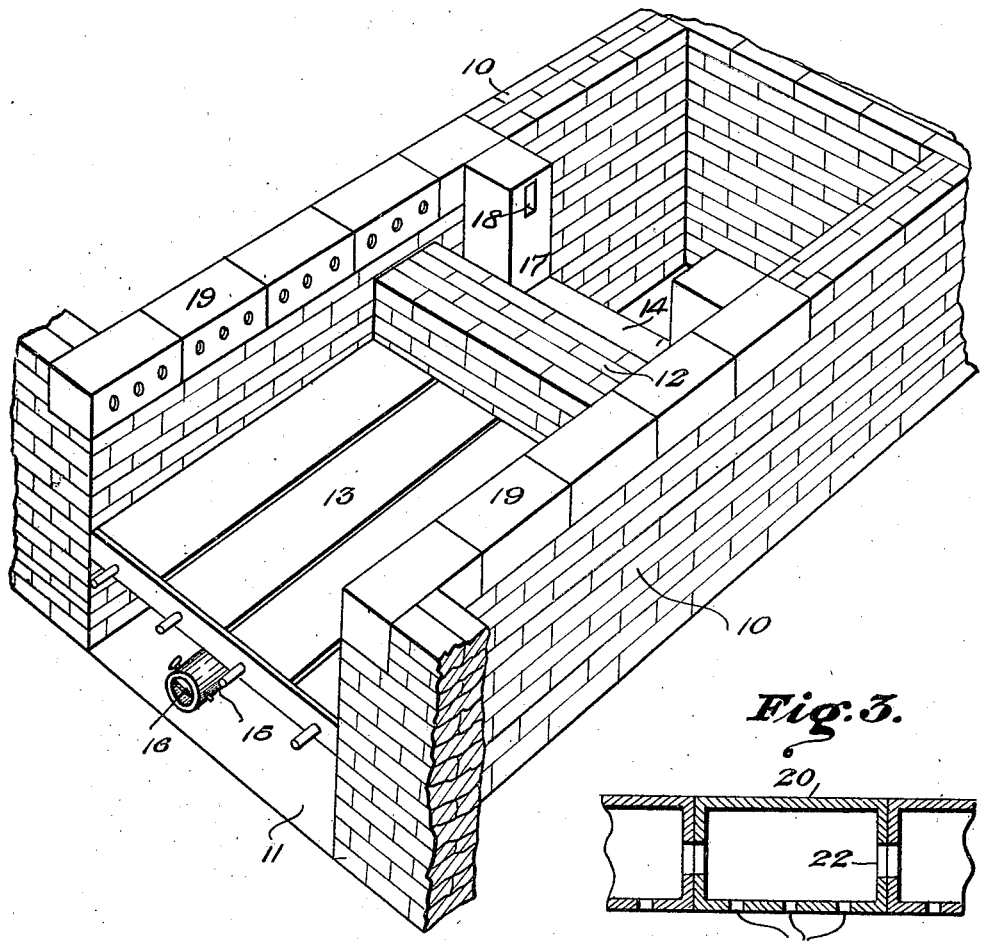
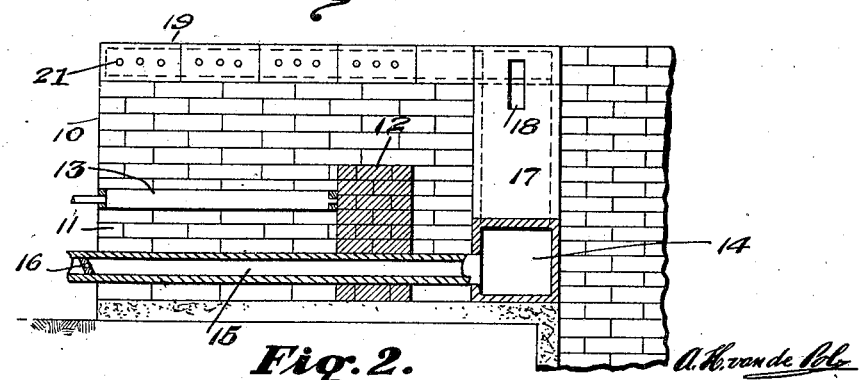

Patented May 1, 1923.

1,453,960

UNITED STATES PATENT OFFICE.

ALFONS H. VAN DE POL, OF PHILADELPHIA, PENNSYLVANIA, ASSIGNOR OF ONE-HALF TO JOHN J. BRIDGEFORD, OF PHILADELPHIA, PENNSYLVANIA.

FURNACE CONSTRUCTION.

Application filed February 12, 1921. Serial No. 444,425.

*To all whom it may concern:*

Be it known that I, ALFONS H. VAN DE POL, a subject of the Queen of Holland, residing at Philadelphia, in the county of Philadelphia and State of Pennsylvania, have invented new and useful Improvements in Furnace Constructions, of which the following is a specification.

This invention relates to improvements in furnaces and has for an object the provision of means for supplying preheated air to the fire box of the furnace to aid combustion, and the consumption of gases, which otherwise pass off through the flue.

Another object is the provision of means for forming an air baffle or retarding wall at the rear of the usual baffle wall so that the products of combustion will be further retarded before reaching the flue and thus decrease loss of heat and the amount of fuel required and add greatly to the efficiency of the furnace.

A further object of the invention is the provision of a construction for accomplishing the above results, which includes means whereby the air will be evenly distributed over the entire grate area.

With the above and other objects in view, the invention further includes the following novel features and details of construction, to be hereinafter more fully described, illustrated in the accompanying drawings and pointed out in the appended claim.

In the drawings:—

Figure 1 is a perspective view illustrating a fragmentary portion of a furnace with the invention applied thereto.

Figure 2 is a fragmentary longitudinal vertical sectional view.

Figure 3 is a detail horizontal section through one of the horizontal air distributing conduits.

Referring in detail to the drawings, wherein like characters of reference denote corresponding parts, the reference character 10 indicates the side walls of a furnace, 11 the fire box having the usual baffle wall 12 extending along its rear and 13 designates the grate.

Located at the rear of the baffle wall 12 and arranged horizontally across the bottom of the furnace is a conduit 14, to which air is supplied by a pipe 15, the latter being controlled by a damper 16. Extending upwardly from each end of the conduit 14 and along the side walls 10, are vertical conduits 17 which communicate with the conduit 14, the said vertical conduits 17 being provided with openings 18 located in their inner or opposed walls.

Extending along the side walls 10 and arranged horizontally within these side walls are conduits 19, the said conduits being in communication with the conduits 18 and extending forwardly therefrom preferably to the front wall of the furnace. The conduits 19 are of cellular construction, being preferably formed of separate fire brick or tile 20, each of which is provided with air escape openings 21 and with end openings 22, which serve to provide communication between the separate fire brick or tile. The openings 21 are arranged along the inner faces of the conduits 19 above the grate 13 and air entering through the pipe 15 will travel upward through the conduit 17 and enter the conduit 19. The passage of this air through the conduits will be retarded so that the separate tile will be filled with air, which will escape in relatively even quantities for distribution over the entire grate area. In addition, air will escape through the openings 18 and be directed across the furnace and form an air wall or baffle so as to retard the escape of the products of combustion and permit them to be fully consumed. At the same time, the draft of the furnace will not be interferred with.

The invention is susceptible of various changes in its form, proportions and minor details of construction and the right is herein reserved to make such changes as properly fall within the scope of the appended claim.

Having described the invention what is claimed is:—

The combination of a furnace including a grate and a baffle wall extending transversely across the furnace at the rear end of the grate; a conduit arranged horizontally across the bottom of the furnace in the rear of the baffle wall, an air supply pipe arranged below the grate thence disposed through the baffle wall and communicating with the conduit intermediate its ends, a vertically disposed conduit communicating and rising from each end of the horizontal conduit and being provided with air escape openings designed to face each other and to direct the air across the furnace to form a wall so as to retard the escape of products of combustion, perforated conduits arranged horizontally within each side wall of the furnace and being designed to communicate with the vertically arranged conduits and extending forwardly therefrom to the front of the furnace.

In testimony whereof I affix my signature.

ALFONS H. van de POL.